No. 648,077. Patented Apr. 24, 1900.
W. I. LUDLOW.
CRANK SHAFT.
(Application filed Aug. 22, 1898.)
(No Model.)
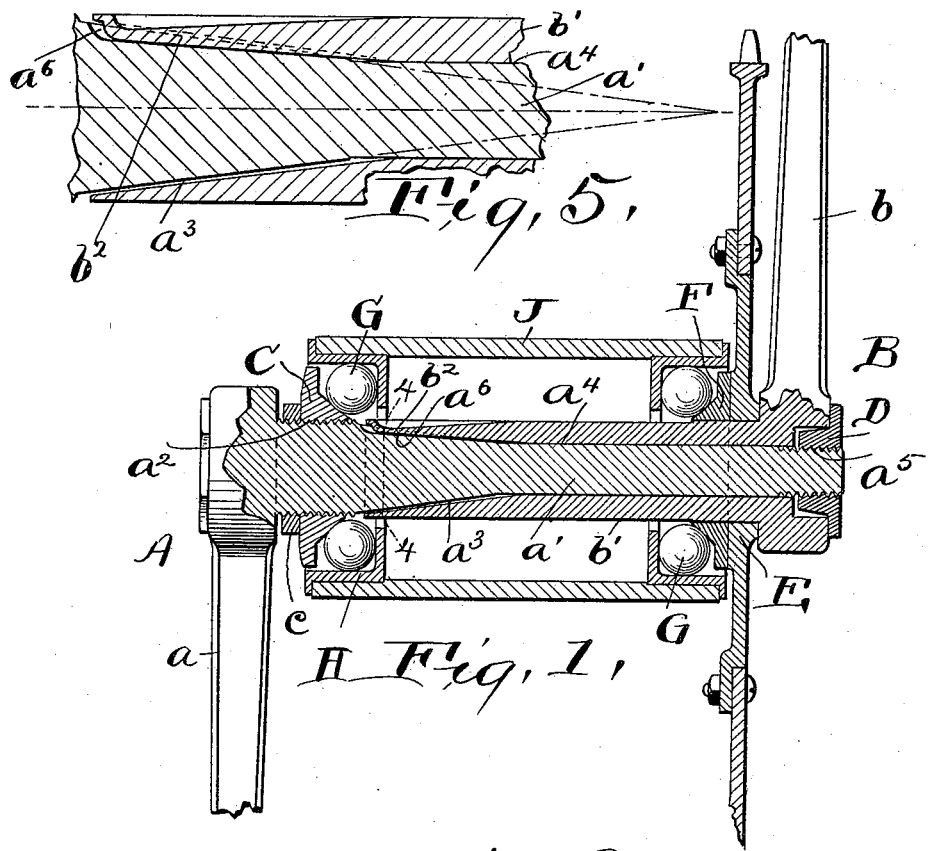
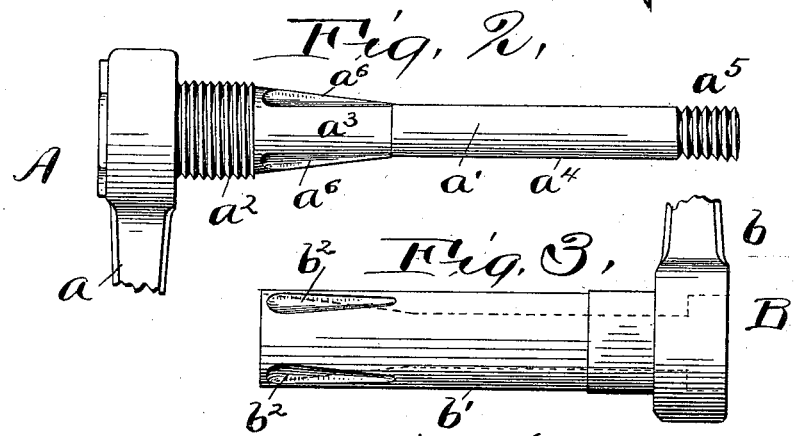
Witnesses
E. B. Gilchrist
Philip E. Knowlton
Inventor,
Washington I. Ludlow,
By his Attorneys,
Thurston & Bates.

UNITED STATES PATENT OFFICE.

WASHINGTON I. LUDLOW, OF CLEVELAND, OHIO, ASSIGNOR OF ONE-HALF TO DANIEL R. TAYLOR, OF SAME PLACE.

CRANK-SHAFT.

SPECIFICATION forming part of Letters Patent No. 648,077, dated April 24, 1900.

Application filed August 22, 1898. Serial No. 689,189. (No model.)

*To all whom it may concern:*

Be it known that I, WASHINGTON I. LUDLOW, a citizen of the United States, residing at Cleveland, in the county of Cuyahoga and State of Ohio, have invented a certain new and useful Improvement in Crank-Shafts, of which the following is a full, clear, and exact description, reference being had to the accompanying drawings.

The object of my invention is to provide a bicycle-crank and bearing which shall be very cheap in construction and efficient in service and neat in appearance, while the parts may be easily detached for cleaning or other purposes.

The invention consists in the construction and combination of parts hereinafter described, and pointed out definitely in the claims.

The drawings clearly illustrate my invention.

Figure 1 is a vertical sectional longitudinal section through the bearings and shaft of the crank. Figs. 2 and 3 are side elevations of the two portions of the crank, the former showing that part which is at the left in Fig. 1 and the latter that part which is at the right. Fig. 4 is a transverse section through the two pieces of the crank-shaft when in engaging position, being on the line 4 4 of Fig. 1. Fig. 5 is an enlarged fragmentary longitudinal central section through the two parts of the crank-shaft at their tapered portions.

The crank, with the exception of the nut which draws the parts together, is made up of two pieces, which are designated herein A and B. The part A consists of the arm $a$, having projecting from it integrally the stud or shaft $a'$, and the part B consists of the arm $b$ and the integral sleeve $b'$, which surrounds the shaft $a'$. This stud $a'$ is constructed as shown in the drawings—that is, next to the arm $a$ it has a thread $a^2$, on which turns the adjustable cone C and the jam-nut $c$ therefor. At the termination of the thread $a^2$ the shaft is tapered down, as shown at $a^3$, and then extends cylindrically, as at $a^4$, to the thread $a^5$, which is formed at the free end.

In the tapered part $a^3$ of the stud are a plurality of grooves $a^6$. These grooves may be milled or otherwise formed in the tapered part. They extend away from the axis as they approach the larger end of the tapered portion; but, as will be seen from Fig. 5, their bottoms do not constitute as steep a taper as the conical surface $a^3$. These grooves vanish where the tapered portion $a^3$ joins the cylindrical part $a^4$ of the stud. The grooves are made with their bottoms and sides one continuous curve in cross-section, as shown more clearly in Fig. 4. They may thus be described as "tapering laterally," by which is meant that the sides of the grooves in any cross-section, as Fig. 4, flare outward from the bottom of the groove toward the top.

It will be understood from the foregoing description that these grooves lie at a less angle to the axis of the stud than does the surface of the tapered part thereof, as will be seen clearly from Fig. 5.

The sleeve $b'$ snugly surrounds the cylindrical part of the shaft $a'$; but the free end of this sleeve is tapered in its interior, so as to be complementary to the tapered portion of the shaft $a'$, and in this portion of the sleeve are formed elongated dents $b^2$, which bend the metal integrally inward, so as to make ribs in the inner side of the sleeve, the inner surface of these ribs being substantially complementary to the grooves in the stud. In other words, these ribs lie at the same angle to the axis as do the grooves, and consequently they lie at a less angle thereto than does the tapered surface from which they project. They also taper laterally in substantially the same degree as the grooves, being formed on the same curve in cross-section as are the grooves. These ribs are therefore complementary to the grooves, both with respect to their inclination to the axis of the shaft and with respect to their cross-sectional formation.

When the two parts of the crank are placed together, they are drawn tightly into place by the nut D, which screws onto the thread $a^5$ on the A part of the crank and bears against the B part. In this position the ribs $b^2$ take into the grooves $a^6$ and securely lock the two parts of the crank together. The internal taper on the sleeve does not bind against the external taper of the stud, except at the ribs and grooves, as clearly appears from Fig. 5. These ribs do not extend longitudinally quite as far as the grooves, wherefore the bearing at the tapered portion comes entirely on the grooves and ribs, and there is no stop preventing the nut D drawing the two parts of the crank snugly together. The described engagement of the ribs and grooves on the tapered parts of the sleeve and stud, respectively, holds said parts in such relative position that their axes are coincident, and they likewise prevent any relative rotary movement. They likewise prevent the tapered walls of the stud and sleeve from coming into contact, and therefore it is easier to separate these parts whenever necessary. It is also apparent that if the engaging ribs and grooves wear, so as to permit any looseness this looseness may be taken up by drawing the stud farther into the sleeve by means of the nut D. The described results are due not only to the inclination of the ribs and grooves relative to the inclined parts of the sleeve and stud, but also to the fact that said ribs are similarly laterally tapered or curved in cross-section, whereby said ribs contact with the grooves not only at the bottom thereof, but continuously up to the edges of both sides.

By making the engaging internal ribs of the sleeve in the form of integral dents bent in from the outside a very simple and cheap construction is provided. These dents may be simply swaged in with a die on a mandrel or inner die corresponding in shape to the male member of the crank at this point, and it is unnecessary to mill or otherwise finish their inner surfaces. The sleeve is simply first bored out conical and then the dents swaged, and the operation is finished.

The spider or collar of the sprocket-wheel E is secured to the sleeve $b'$ against the crank-arm by being shrunk in place or in other suitable manner, and the non-adjustable cone F is forced into place against this spider.

When the parts are in place in a bicycle, the rigid cone F and the adjustable cone C bear against balls G, which roll in suitable cups H, which are secured in the ends of a suitable crank-hanger or bracket J.

Having described my invention, I claim—

1. A bicycle crank-shaft formed of two parts, one part consisting of a crank-arm and a stem engaged at its outer end by a fastening device, and the other part consisting of a crank-arm and a sleeve of slightly-larger internal diameter than the corresponding part of the stem, which stem is provided on a part of its length with a plurality of longitudinal grooves inclined to the axis of the stem, and said sleeve being provided along a portion of its interior surface with a plurality of ribs inclined to the axis of said sleeve, said ribs and grooves tapering laterally so that their side surfaces will form a wedging contact when the parts are drawn together and before the ends of the ribs and the parts of the sleeve between the ribs contact with the ends of the grooves and the parts of the stem between the grooves.

2. A two-part bicycle crank-shaft, one part consisting of a crank-arm and a stem provided at its outer end with a screw-thread and a fastening-nut, and the other part consisting of a crank-arm and a sleeve of a slightly-larger internal diameter than the corresponding part of the stem, which stem is provided along a portion of its length with a plurality of grooves inclined to the axis of the stem, and which sleeve is provided on a portion of its inner surface with a plurality of longitudinal ribs inclined to the axis of the sleeve, the inclination being such that the inner faces of the ribs make a wedging contact with the bottoms of the grooves, said ribs and grooves tapering laterally so that their side surfaces will form a wedging contact when the parts are drawn together and before the ends of the ribs and the parts of the sleeve between the ribs contact with the ends of the grooves and the parts of the stem between the grooves.

In testimony whereof I hereunto affix my signature in the presence of two witnesses.

WASHINGTON I. LUDLOW.

Witnesses:
   E. B. GILCHRIST,
   ALBERT H. BATES.